(12) United States Patent
Hoogland

(10) Patent No.: US 7,785,523 B2
(45) Date of Patent: Aug. 31, 2010

(54) MOLD AND METHOD FOR FORMING PLASTIC PRODUCTS

(75) Inventor: Hendricus Antonius Hoogland, Wormer (NL)

(73) Assignee: ECIM Technologies B.V., Ijssel (NL)

( * ) Notice: Subject to any disclaimer, the term of this patent is extended or adjusted under 35 U.S.C. 154(b) by 164 days.

(21) Appl. No.: 11/794,403

(22) PCT Filed: Dec. 23, 2005

(86) PCT No.: PCT/NL2005/000889

§ 371 (c)(1),
(2), (4) Date: Nov. 9, 2007

(87) PCT Pub. No.: WO2006/071112

PCT Pub. Date: Jul. 6, 2006

(65) Prior Publication Data

US 2008/0169584 A1    Jul. 17, 2008

(30) Foreign Application Priority Data

Dec. 27, 2004   (NL) ................................. 1027896

(51) Int. Cl.
*B29C 45/56* (2006.01)
(52) U.S. Cl. .................. 264/328.7; 425/450.1; 425/589
(58) Field of Classification Search ............. 264/328.7; 425/450.1, 589
See application file for complete search history.

(56) References Cited

U.S. PATENT DOCUMENTS

| 4,025,022 A | 5/1977 | Theysohn et al. |
| 4,339,408 A * | 7/1982 | Jenkins ..................... 264/328.7 |
| 4,570,897 A * | 2/1986 | Von Holdt ................... 249/144 |
| 4,732,558 A * | 3/1988 | Grannen, III ............... 425/570 |
| 5,536,161 A * | 7/1996 | Smith .......................... 425/438 |

FOREIGN PATENT DOCUMENTS

| DE | 42 17 343 A1 | 12/1993 |
| DE | 199 32 515 A1 | 1/2001 |
| EP | 0 061 072 A2 | 9/1982 |
| EP | 0 753 390 A1 | 1/1997 |
| EP | 0 832 727 A1 | 4/1998 |
| GB | 1160754 | 11/1966 |

* cited by examiner

*Primary Examiner*—Jill L Heitbrink
(74) *Attorney, Agent, or Firm*—Hoffmann & Baron, LLP

(57) ABSTRACT

Mold (20) for manufacturing plastic products provided with a bottom and a sidewall, wherein the mold comprises at least a first (21) and second (22) mold part which jointly define at least partly at least one mold cavity (100) and are movable in a first direction, wherein the at least one mold cavity comprises at least one first, in particular bottom-forming part (101) and one second (102), in particular sidewall-forming part, wherein on the first mold part at least one fixed wall part (24) is provided which supports a first movable wall part (20) which is movable relative to the respective fixed wall part (24) in at least a second direction which includes an angle with the first direction, wherein in said first movable wall part a second movable wall part (35) is provided, on the side facing the mold cavity, which is movable between a forwardly moved position and a retracted position relative to the first movable wall part.

21 Claims, 6 Drawing Sheets

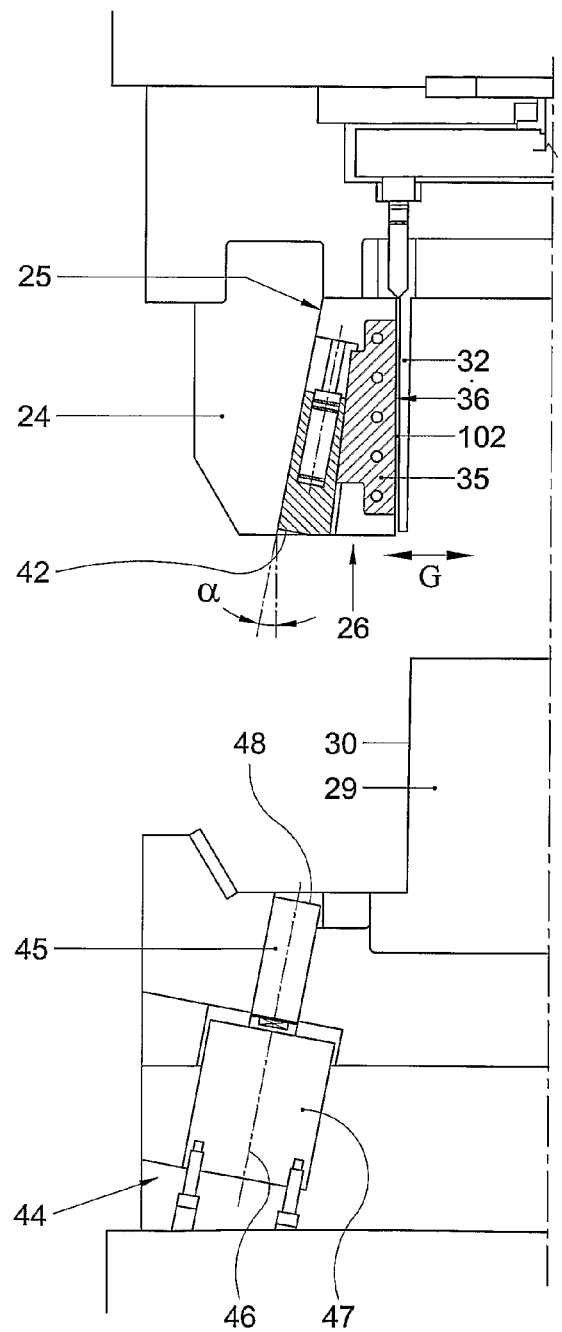
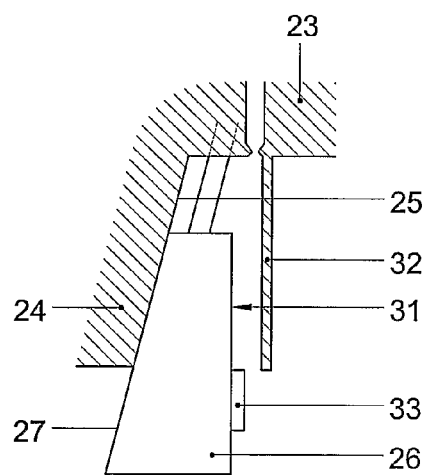
Fig. 4A
Fig. 4

MOLD AND METHOD FOR FORMING PLASTIC PRODUCTS

This application is the U.S. National Phase of, and Applicants claim priority from, International Application Number PCT/NL2005/000889 filed 23 Dec. 27, 2005 and Netherlands Patent Application bearing Serial No. 1027896 filed 27 Dec. 2004, which are incorporated herein by reference.

BACKGROUND OF THE INVENTION

The invention relates to a mold and apparatus for forming plastic products.

For forming plastic products, in many cases use is made of a mold having therein at least one mold cavity matching in shape and dimensions the products to be formed therein. During use, plastic is introduced into the respective mold cavity and allowed to harden through, for instance, solidification, chemical reaction or the like, after which a finished product can be taken out. Such molds are, for instance, injection molds or injection-compression molds.

For the purpose of forming products having for instance a bottom and a wall, such as containers, it is known to use a mold having a first and second mold part which, with the mold closed, define a mold cavity with a bottom-forming part and a sidewall-forming part. In order to make for instance openings or cavities in the sidewall of such a product, use is made of sliding parts which, during, before or after opening of the mold, can be retracted from a forwardly moved position, so that the product can be withdrawn. Incidentally, in a comparable manner, for other, non-withdrawable products molds with slides are used.

SUMMARY OF THE INVENTION

An object of the invention is to provide a mold for forming products, in particular from plastic, with which products can be formed in a particularly suitable manner.

In particular, though not exclusively so, an object of the invention is to provide such a mold with which container-like products can be formed.

A further object of the invention is to provide a method for forming products, for instance from plastic, using a mold.

In a first aspect, a mold according to the invention is characterized by at least a first and second mold part which jointly define at least partly at least one mold cavity and are movable in a first direction, wherein the at least one mold cavity comprises at least one first, in particular bottom-forming part and one second, in particular side wall-forming part, wherein on the first mold part at least one fixed wall part is provided which supports a first movable wall part which is movable relative to the respective fixed wall part in at least a second direction which includes an angle with the first direction, wherein in said first movable wall part a second movable wall part is provided, on the side facing the mold cavity, which is movable between a forwardly moved position and a retracted position relative to the first movable wall part.

In a mold according to the invention, use is made of a wall part which, with the mold closed, can define at least a portion of a mold cavity, which wall part is movable relative to a movable part of a mold part. Directions of movement of these parts include an angle with each other and/or with an opening and closing direction of the mold. In this way, a particularly great freedom of design is obtained for products to be formed in the respective mold.

In a second aspect, a mold according to the invention is characterized in that operating means for a first movable wall part and a second movable wall part movable relative thereto, which is movable along with the first movable wall part, are included at least partly in different mold parts. Upon opening of the mold, at least the first or second movable wall part is thereby separated from an operating means therefor. This enables complex movements of the respective movable wall parts.

The invention further relates to a forming apparatus provided with at least one mold having at least a first and second mold part which jointly define at least partly at least one mold cavity and are movable in a first direction, wherein the at least one mold cavity comprises at least one first, in particular bottom-forming part and one second, in particular side wall-forming part, wherein on the first mold part at least one fixed wall part is provided which supports a first movable wall part which is movable relative to the respective fixed wall part in at least a second direction which includes an angle with the first direction, wherein in said first movable wall part a second movable wall part is provided, on the side facing the mold cavity, which is movable between a forwardly moved position and a retracted position relative to the first movable wall part.

Such a forming apparatus provides the possibility of forming products in a particularly simple manner.

The invention furthermore relates to a method for forming products, in particular from plastic, using a mold having at least a first and second mold part which jointly define at least partly at least one mold cavity and are movable in a first direction, wherein the at least one mold cavity comprises at least one first, in particular bottom-forming part and one second, in particular side wall-forming part, wherein on the first mold part at least one fixed wall part is provided which supports a first movable wall part which is movable relative to the respective fixed wall part in at least a second direction which includes an angle with the first direction, wherein in said first movable wall part a second movable wall part is provided, on the side facing the mold cavity, which is movable between a forwardly moved position and a retracted position relative to the first movable wall part.

With such a method, products can be formed in a fast and simple manner.

In a further aspect of the invention, a method is given which utilizes adiabatic heat development in plastic in the mold, as a result of inter alia the speed of movement of the or each second and/or third moving wall part in the mold. Thus, compared with traditional injection molding with molds without movable wall parts, particular advantages can be achieved, such as, for instance, lowering of the required closing force and injection pressure, lowering of the required injection temperature, and shortening of the cycle time.

BRIEF DESCRIPTION OF THE DRAWINGS

To clarify the invention, exemplary embodiments of molds, apparatuses and methods according to the invention will be further elucidated with reference to the drawing, in which:

FIG. 4 shows in a partly cross-sectional side view according to FIG. 3 the left-hand half of the mold in open condition, with the first movable wall parts in a forwardly moved position and the second movable wall parts in a retracted position;

FIG. 4A shows a portion of a fixed wall part with a first movable wall part moved away;

DETAILED DESCRIPTION OF THE INVENTION

Figure 1:
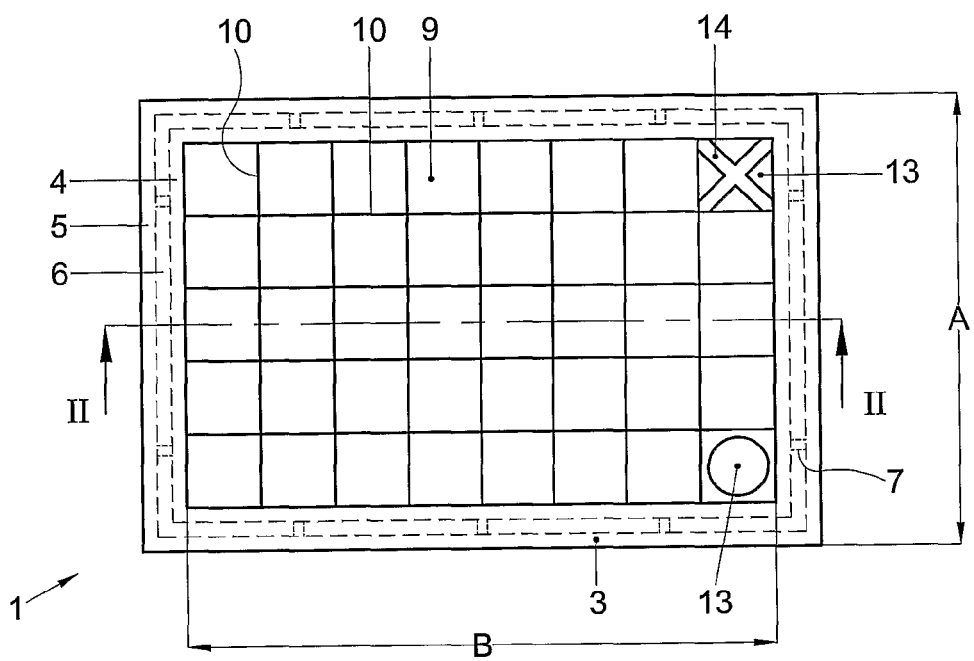
FIGS. 1 and 2 show a product in top plan view and partly sectional side elevation.

In this description, identical or corresponding parts have identical or corresponding reference numerals. Combinations of parts of the embodiments shown are understood to be represented herein as well. In this description, as an example, a crate, in particular a crate for bottles, will be described. However, the invention should not in any way be taken as being limited thereto. Many other holders, with or without compartmentation, having bottom surfaces of a variety of different shapes such as circular, rectangular, square, or any other shape, are possible within the framework of the invention. Also, holders can be formed with and without cavities in the sidewalls and/or bottom. Further, also other products can be manufactured in the same or a comparable manner, for instance partly hollow plate-shaped, bar-shaped, tubular or differently shaped products. The products can have a longitudinal wall or longitudinal walls extending at right angles to a bottom surface, but the or a longitudinal wall thereof can also be inclined relative to the bottom surface.

In a mold and method according to the invention, different materials, in particular different plastics, can be used, in particular thermoplastic plastics and blends. Also crystalline plastics and mixtures thereof have particularly good utility within the invention.

Figure 2:
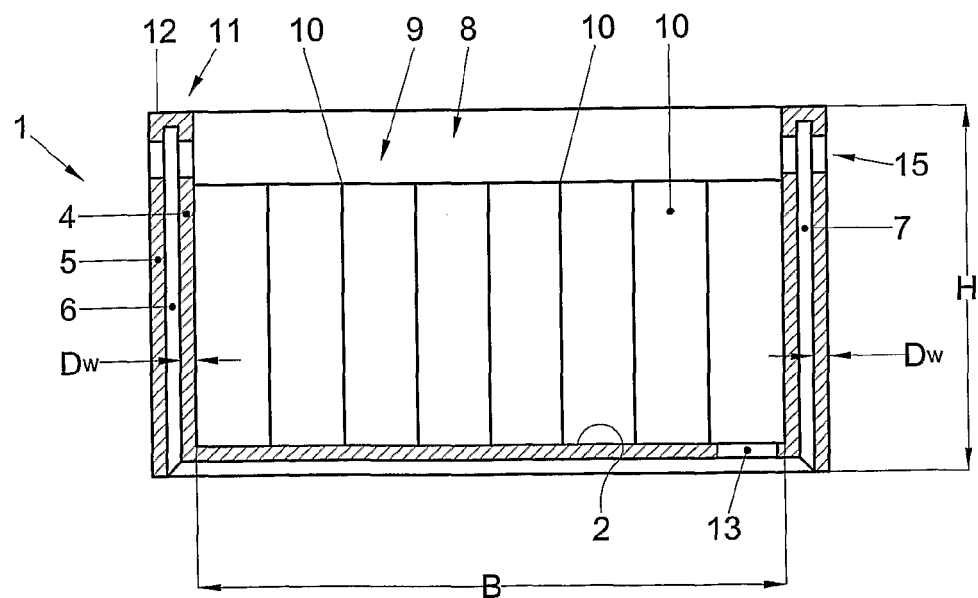

FIG. 1 shows, in top plan view, a holder 1 according to the invention, in the form of a bottle crate, to which the invention is not limited. FIG. 2 shows the holder 1 in cross-sectional side view. This holder 1 comprises a bottom surface 2 and a longitudinal wall 3 extending therefrom. The longitudinal wall 3 is substantially double-walled, which means that it comprises a first wall 4, a second wall 5 and, located therebetween, a cavity or open space 6. The wall thickness Dw is relatively small with respect to the dimensions A, B of the bottom surface 2 and the height H. The wall thickness can be, for instance, between some tenths of millimeters and some millimeters, depending on, for instance, the holder dimensions, intended use and the like. Between the walls 4, 5 cross partitions 7 can be provided, preferably having a comparable wall thickness, for stiffening and increasing the bearing capacity. Within the longitudinal wall 3 and the bottom surface 2, in an inner space 8, a compartmentation 9 is provided by cross walls 10. These reach to a point under the upper side 11 of the longitudinal wall 3. The upper ends of the walls 4, 5 are interconnected by a carrier edge 12, preferably having a wall thickness comparable to that of the walls 4, 5. In the bottom surface 2, openings 13 can be provided, being for instance circular, as shown at the bottom, right, or formed by cross bars 14, as shown at the top, right. By providing openings, material and weight, cooling time and/or closing pressure can be limited. In the longitudinal wall 3 handles 15 are provided at opposite sides.

Hereinafter, a mold 20 and method will be described which can be used for a holder 1 according to the invention. It will be clear, however, that also a variety of other products can be manufactured with a comparable mold, for instance containers of a different kind, especially also single-walled holders.

Figure 3A:
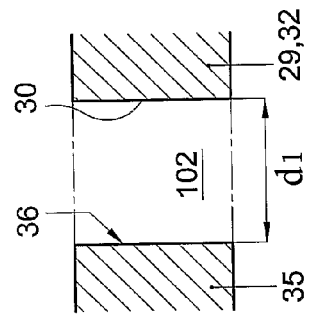
FIGS. 3A and B show on an enlarged scale the distance between the second movable wall part and an adjacent core (part), with the second movable wall part in the retracted position and in the forwardly moved position, respectively.
Figure 3B:
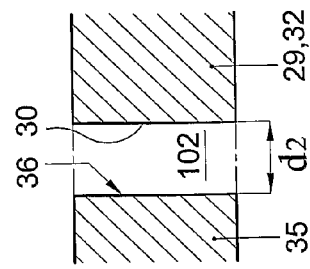
FIG. 3 shows, in partly cross-sectional side view along the line III-III in FIG. 6, a mold according to the invention, in closed condition, with on the left in the drawing a second movable wall part in a retracted position and on the right in a forwardly moved position.
Figure 3:
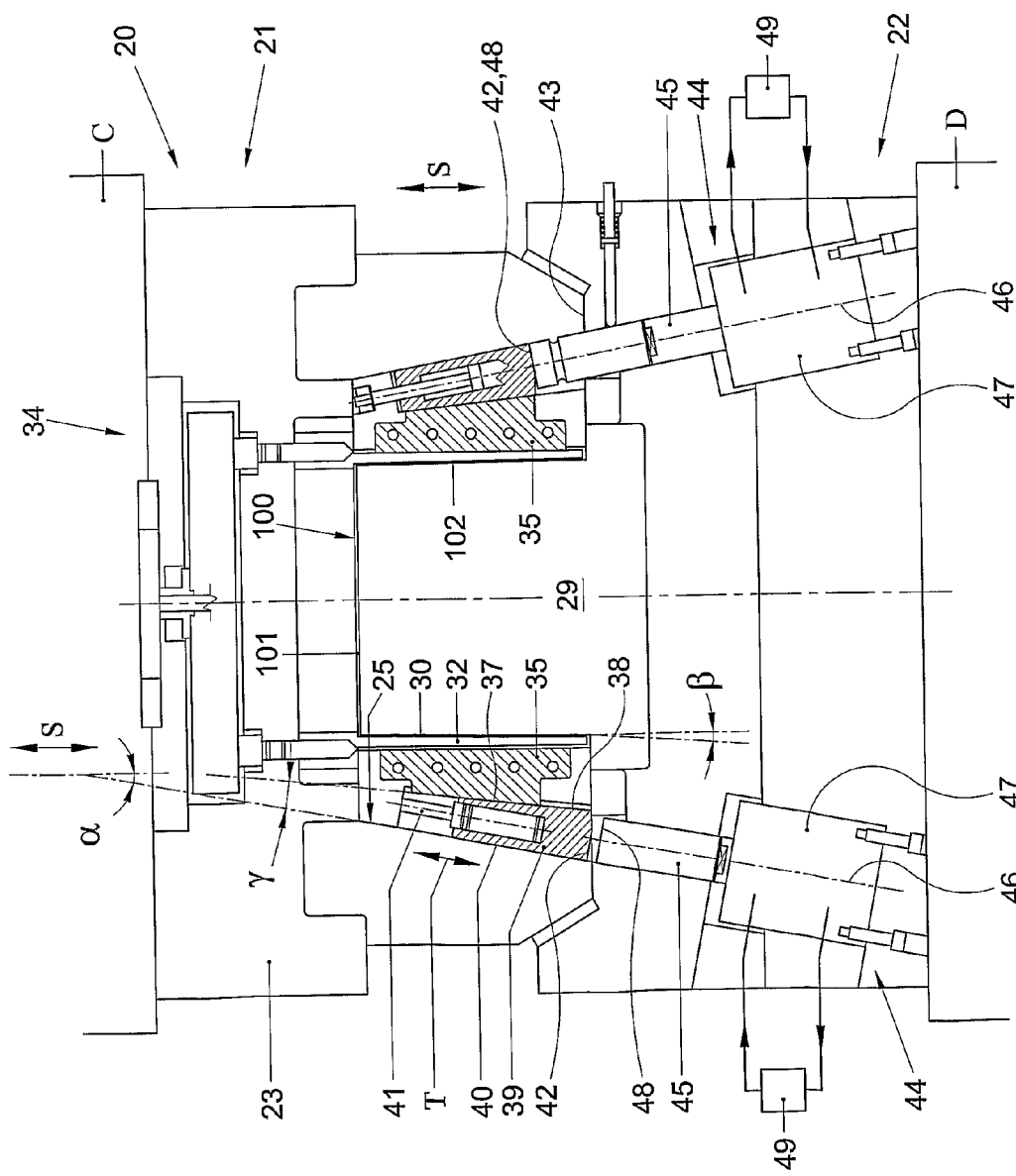

FIGS. 3 and 4 show a mold 20 in a closed and open condition, respectively. The mold 20 comprises a first part 21 and a second part 22, which can move relative to each other in an opening and closing direction, indicated by the arrow S. To that end, for instance the first part 21 is included on a fixed table C and a second part 22 on a movable table D of a press (not shown) or like injection molding apparatus known per se. Incidentally, a variety of other means can also be used for opening and closing the mold 20. The mold 20 comprises a mold cavity 100 with a first part 101, being a bottom-forming part in the exemplary embodiment shown, and a second part 102, being a wall-forming part in the embodiment shown.

Figure 5:
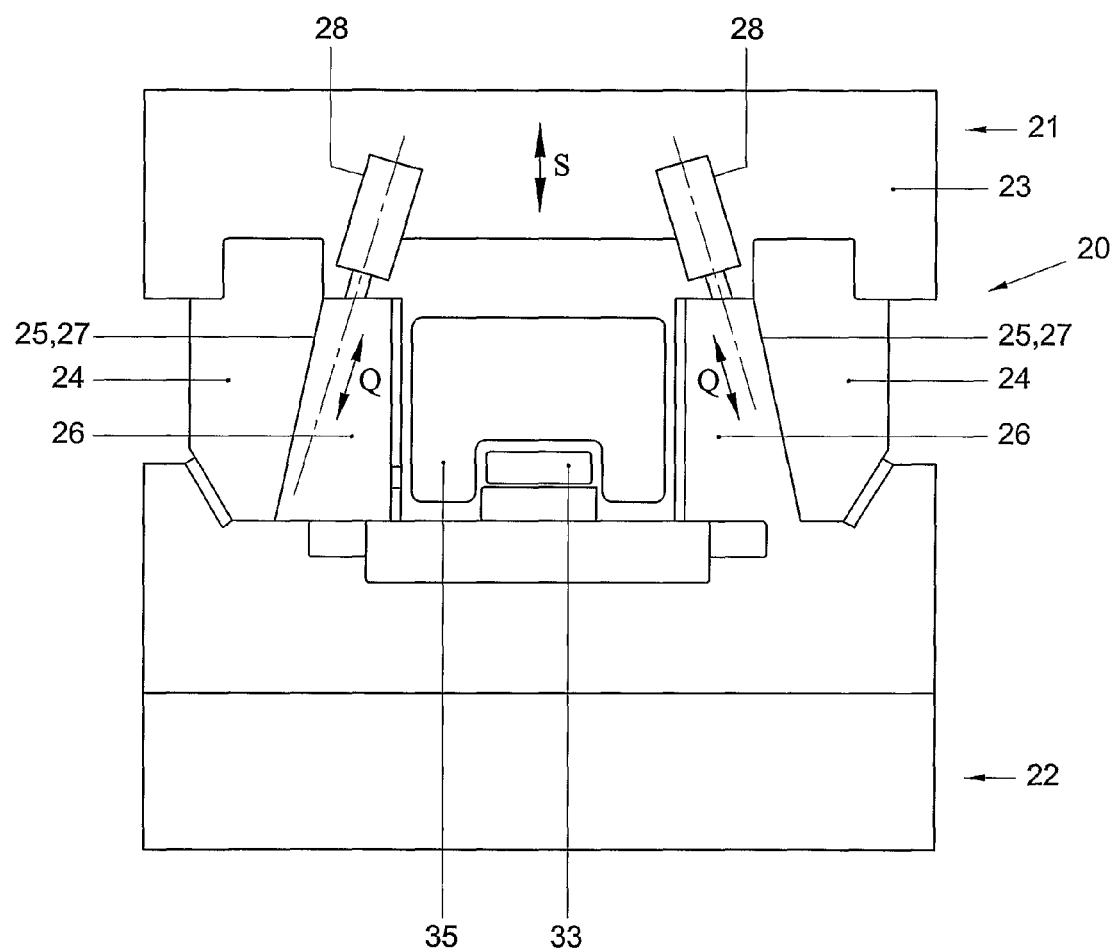
FIG. 5 shows in sectional front view along the line V-V in FIG. 6 a mold according to the invention, in closed condition.
Figure 6:
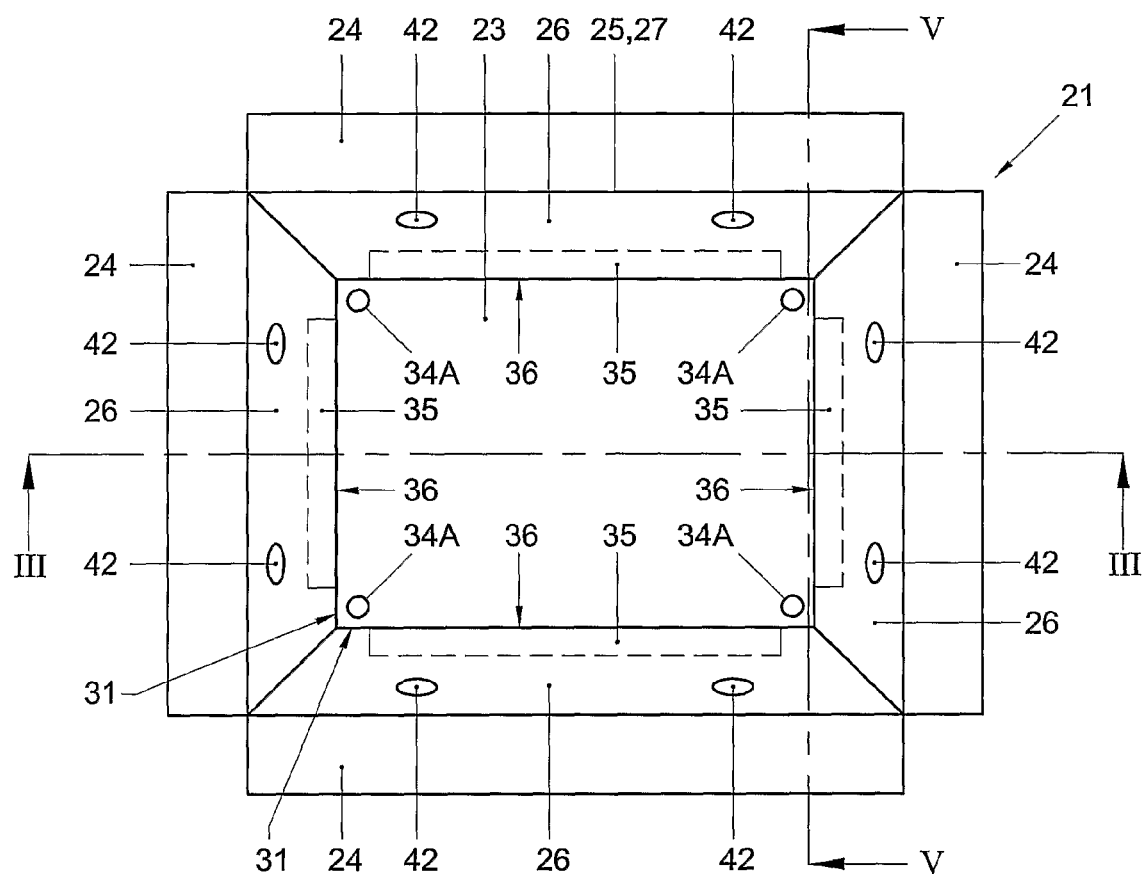
FIG. 6 shows a first mold part according to the invention, in an elevation seen from the second mold part.

FIG. 6 schematically shows an elevation of the first part 21, viewed in the direction S from the (removed) second part 22. The first part 21 comprises a bottom plate 23 having thereon four fixed wall parts 24 upstanding from the bottom plate 23, extending along the sides of a rectangle. The fixed wall parts 24 are provided, on the sides facing each other, with a first guide surface 25 which includes an angle α with the direction S. On each fixed wall part 24, a first movable wall part 26 is carried, of which a second guide surface 27 abuts against the first guide surface 25 and includes a same angle α with the direction S. First operating means 28, as schematically drawn in as a piston-cylinder assembly in FIG. 5, are included in the first mold part 21 for moving the first movable wall part 26 along the first guide surface 25 in a second direction Q, parallel to angle α.

As appears clearly from FIGS. 3-6, the second mold part 22 is provided with a core part 29 which, with mold 20 closed, can be moved between the first movable wall parts 26, for forming for instance the inner space 8, the partitions 7 and the like. In the drawing, for simplification, the core part 29 is drawn as a block, with sides having a draft angle β. As appears from FIG. 3, with the mold closed, between the sides 30 of the core part 29 and the wall surface 31 of each first movable wall part 26 that faces the core part 29, a thin core 32 is included, mounted on the bottom plate 23, for forming the cavity 6 in the walls of the holder 1. These cores 32 can be omitted if for instance a holder 1 with solid walls is manufactured. As appears from FIG. 4A, on the wall surface 31 a projection 33 may be provided which, with the mold closed, reaches into or through the core 32, for instance as far as against the core part 29, and can form a handle 15 or other opening or a deepened portion in the respective side of the holder 1.

The mold 20 is provided, in the bottom plate 23, with injection means 34, at least injection openings 34A, through which during use plastic or other material can be introduced into the mold 20, for forming a product such as holder 1 shown. In the exemplary embodiment shown, the openings 34A are provided near corners of the cores 32.

In each of the first movable parts 26, in the wall surface 31 a second movable wall part 35 is arranged, which is movable between a retracted position, as shown in FIG. 3 on the left-hand side, and a forwardly moved position, as shown in FIG. 3 on the right-hand side. To that end, these second movable wall parts 35 can move in a fourth direction G which, for instance, are all approximately at right angles to the opening and closing direction S. Each second movable wall part 35 has a wall-forming part 36 on the side facing the core part 29. On the opposite side, each second movable wall part 35 is provided with a first operating surface 37. Seen from the core part 29, behind each second movable wall part 35, against the first operating surface 37, a second operating surface 38 has been laid which forms part of a slide 39 which is movable along the first operating surface 37, in a third direction T. Each slide 39 has its opposite countersurface 40 supported against the first guide surface 25 and can move along it. Each slide 39 is slightly wedge-shaped, in the sense that the countersurface 40 and the second operating surface 38 slant towards each other in the direction of the bottom plate 23. The first operating surface 37 includes an angle γ with the first guide surface 25, which approximately corresponds to the wedge angle γ of the slide 39. This means that if the slide 39 is moved in the third direction T towards the bottom plate 23, the second movable wall part 35 is pushed away from the first guide surface 25. Since this second movable wall part 35 is guided by the first movable wall part 26 so as to be movable only in the fourth direction mentioned, it is forced in the direction of the core 32 and the core part 29.

For obtaining proper guidance, each slide 39 is slidable over or along a guide rod 41 which extends through the first movable wall part 26 in the direction T.

On the side remote from the bottom plate 23, an end 42 of the slide 39 is situated in or near a partial surface 43 of the mold. In FIG. 6 an embodiment is shown where for each second movable wall part 35 two slides 39 are provided, whose ends 42 have been drawn in as ovals.

In the second mold part 22, for each slide 39 an operating means 44 is provided, comprising a piston-cylinder assembly 47 with a piston rod 45 having a longitudinal axis 46 extending parallel to the third direction T. The piston rod can move in the direction of the longitudinal axis, and hence in the third direction T, driven by the piston-cylinder assembly 47, for instance hydraulically, pneumatically or electrically. Of course, all kinds of other means, known per se, can be provided for driving the piston rod 45 in the third direction T. The piston rod 45 has a forward end 48 which, with mold 20 closed, can abut against the end 42 of the slide 39, for moving same. As is clearly apparent, the piston rod 45 is not fixedly connected with the slide, so that the mold can be simply opened and closed.

In the exemplary embodiment shown, the piston-cylinder assembly 47 is driven by hydraulic means, schematically represented by the rectangle 49. Such means will be immediately clear to those skilled in the art.

A mold 20 according to the invention can be used as follows.

The mold 20 is closed, as shown in FIG. 3, with the first movable wall parts 26 in a forward position, in contact with the bottom plate 23, and the second movable wall parts 35 in the retracted position, as shown on the left-hand side. The piston rods 45 are in a retracted position, with the ends 42, 48 just butting against each other or at a slight distance. In this condition, plastic is introduced into the mold cavity via the openings 34A, near the transition between the first and second part 101, 102 of the mold cavity 100. The plastic will largely fill the two parts 101, 102, though not completely so since the volume of plastic that is introduced into the mold cavity is virtually equal to the volume of the desired end product, whereas the volume of the mold cavity is greater as a result of the retracted second movable wall parts 35. After at least the greater part and preferably all of the plastic has been introduced into the mold cavity, the piston-cylinder assemblies 47 are energized, so that the piston rod is moved forcefully in the direction of the bottom plate 23, in the third direction T. It will thereby carry along the slide 39 abutting against it, so that the respective second movable wall part 35 is moved in the fourth direction, to the forwardly moved position, as shown in FIG. 3 on the right-hand side. Plastic between the respective second movable wall part and the opposite part of the core 32 or core part 29 will be displaced and the entire mold cavity is filled with the plastic. With all second movable wall parts 35 in the forwardly moved position, the volume of the mold cavity 100 is substantially equal to that of the plastic introduced, while optionally after-pressure can be applied for compensation of shrinkage. In this condition the mold cavity moreover has the shape of the desired product.

After in this condition the plastic has been allowed to solidify for some time, the mold 20 is opened for removal of the product 1. To that end, the piston rods 45 are retracted substantially into the second part 22 of the mold 20, as shown in FIG. 3 on the left-hand side. Next, the second part 22 is moved away from the first part 21, preferably simultaneously, or at least synchronized, with the movement of the first movable wall parts 26 to a rearward position shown in FIG. 4A. In that position, the projections 33 have been pulled away, and the product 1 (not shown in FIGS. 4 and 4A) can be taken from the first mold part 21. Next, the mold 20 can be closed again for a next cycle.

It is preferred that the second movable wall parts are moved to the forwardly moved position at high speed, preferably so fast that adiabatic heat development occurs at least in a part of the displaced plastic. It is advantageous in particular when the temperature in the displaced plastic and/or plastic to be displaced thereby obtains and/or keeps a temperature above the melting temperature of the respective plastic, so that the viscosity is reduced. The speed will then have to be chosen depending on for instance the plastic used, the desired wall thickness of the product at the respective positions, the total dimensions of the product, flow path lengths and cross sections, moving distance of the second movable wall parts. The suitable speed can be simply determined, for instance through experimentation with different speeds. As a consequence, the injection pressure of the plastic can be relatively low, and so can the closing pressure for keeping the mold closed. As a result, the properties of the plastic are not adversely affected and relatively stress-free products can be formed with particularly thin wall thicknesses and/or different wall thicknesses, and moreover relatively short cycle times are achieved. Moreover, as a result of the relatively low pressures, the advantage is achieved that relatively little material needs to be used for the mold, and cores, inserts and the like, if applicable, can be made of light and thin design. In this way, the freedom of design is enlarged still further.

In the embodiments shown, the angle α is for instance in the order of magnitude of between 5 and 30 degrees, more particularly approximately 15 to 20 degrees and the angle β between the closing direction S and the wall 30 is particularly small, in particular less than 5 degrees, for instance 1 to 2 degrees. The angle γ in the exemplary embodiment shown is smaller than the angle α and is between 1 and 10 degrees. This angle is for instance 2 to 6 degrees. These angles can in each case be chosen in a suitable manner on the basis of the desired speed of movement of the slide 39 and the second movable wall part 35, the force required therefor and the distances to be traveled.

Figure 7:
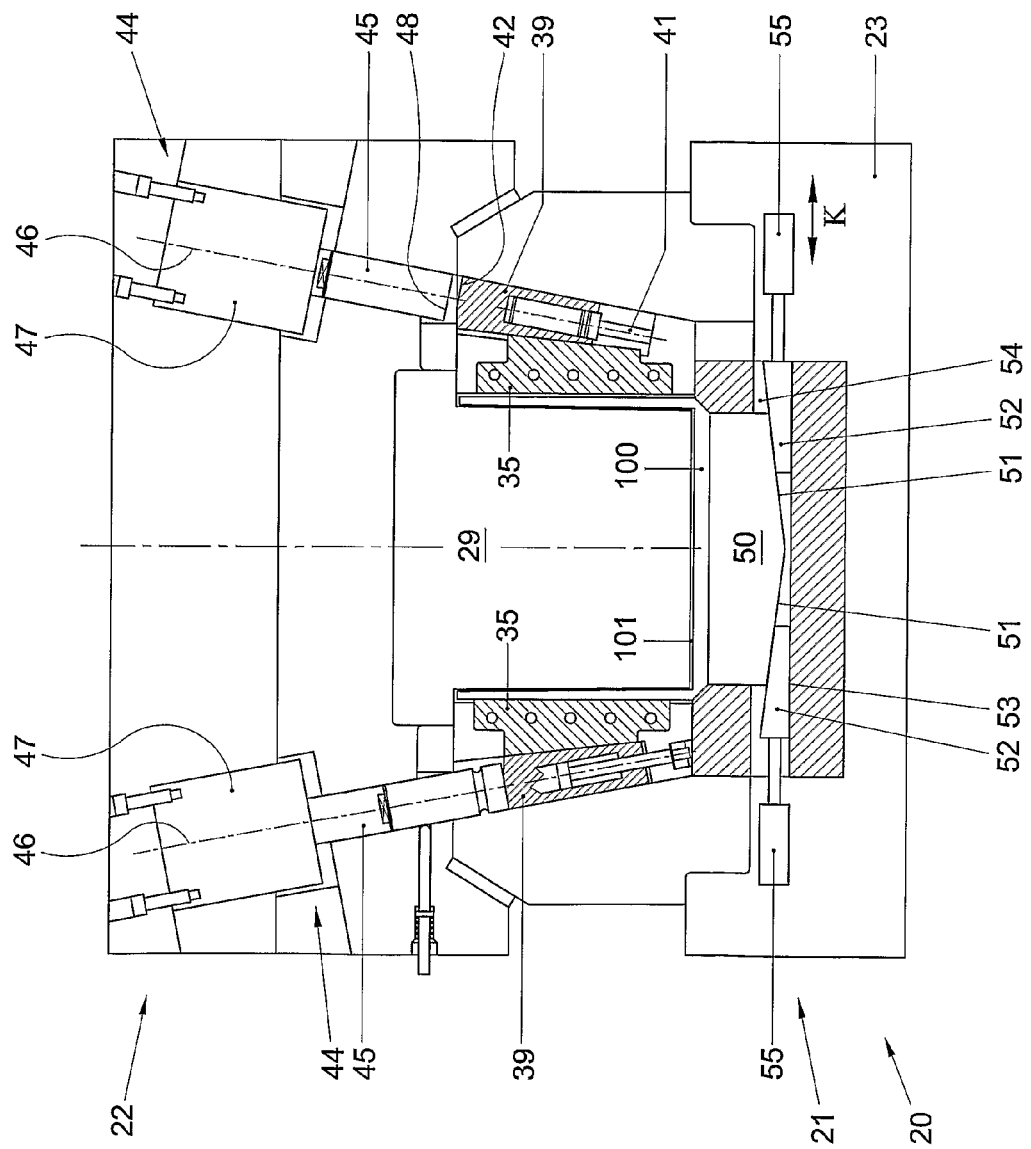
FIG. 7 shows, in a similar elevation to FIG. 3, a mold according to the invention, in an alternative embodiment with a third movable wall part in a bottom-forming part.

In FIG. 7 an alternative embodiment of a mold 20 according to the invention is shown, which is broadly identical in structure to that according to FIGS. 3-6. These parts will not be further described here. In this embodiment, in the bottom-forming part, a third movable wall part 50 is provided. This wall part 50, on its side remote from the mold cavity 100, has two surfaces 51 sloping towards the middle. From two opposite sides, wedge-shaped slides 52 extend under the surfaces 51, which wedges 52 rest on a bottom 53 of a slot 54. Each slide 52 is drivable along the bottom 53 by means of a piston-cylinder assembly 55 or other earlier-discussed driving mechanism, in a fifth direction K. In FIG. 7, the wall part 50 has been moved into a retracted position, that is, away from the core part 29. In this condition, plastic can be introduced into the mold cavity 100 in the manner described earlier.

After the plastic has been introduced into the mold cavity 100, the second and third movable wall parts are moved to the forwardly moved positions. To that end, the slides 39 and wedges 52 are moved in the third direction T and the fifth direction K, respectively. Thereupon, the product 1 can solidify and be taken out of the mold 20 in the manner described earlier.

With such a mold, the introduction of the plastic is simplified still further and the pressure can be kept low, also if a thin bottom wall and/or particularly long flow paths are used. With it, also ribs and the like can be provided in a simpler manner.

The invention is not limited in any way to the embodiments shown and described in the description and drawings. Many variations thereon are possible within the framework of the invention as outlined by the claims.

In the embodiments shown, the operating means 40 are included in the second mold part. However, it is naturally also possible to include them at least partly in the plate D of the press. The second part 22 of the mold can then comprise the shafts 45. In this way, a universal tool can be manufactured on which in each case a different mold 20 can be placed which can be made of particularly simple and light design since the relatively heavy and costly parts of the operating means 44 can be used again and again.

It will be clear that the directions of movement can also be chosen differently than shown. Thus, for instance, the slide 39 can be made to be movable parallel to the first direction S, with adaptation of the operating surfaces 37, 38, at least the angle thereof with respect to the direction S. Also, in principle, the operating means 44 for the second movable wall parts 35 can be included in the first mold part 21, with adaptation of the operating surfaces 37, 38, such that the slide 39 is moved in the direction of the second part 22 for moving the second movable wall part 35 to the forwardly moved position. Many variations thereof are possible and will be immediately clear from the description and drawings to those skilled in the art.

For instance, a plurality of mold cavities may be included within a mold according to the invention, both next to and above each other, for instance on opposite sides of the bottom plate. The first and second mold part can be interchanged, so that injection proceeds through or along the core part 29. In-mold labels, inserts and the like can be used in a mold according to the invention. The mold cavity can have any desired shape. It will be clear that any desired number of first, second and/or third movable wall parts can be used, depending on the products to be formed. A product formed with a mold or method according to the invention can for instance have a fully closed bottom, single-walled sidewalls or parts thereof, a different compartmentation or none, and the like. Other operating means may be provided for moving the slides and wedges, for instance electric or pneumatic mechanical lever systems, linkages and the like. Optionally, the energy of injection of the plastic can be used at least partly for moving one or more movable wall parts, for instance to a retracted position. What is shown is a continuous wall of the product 1. However, individual, mutually separated wall parts can naturally be used as well. The or each fixed wall part can be shaped and/or placed differently and can for instance carry the first movable wall parts on their sides.

These and many comparable embodiments are understood to fall within the invention.

The invention claimed is:

1. A method for manufacturing plastic products having a bottom and a sidewall, the method comprising the steps of:
   closing a mold, while a second movable wall part is brought into a retracted position and a first movable wall part is in a forward position to define a mold cavity having a first volume;
   injecting plastic into the mold cavity defined by the mold, the mold cavity being formed at least between a core part and a wall surface of the second movable wall part that is situated at a first distance from the core part;
   moving the second movable wall part into the mold cavity while the mold is closed to a forwardly moved position with respect to the first movable wall part, such that the respective wall surface is brought to a second distance from the opposed core part, which second distance is smaller than the first distance wherein the mold cavity has a second volume smaller than the first volume, the second movable wall part displacing at least a portion of said plastic, such that the whole mold cavity is filled with plastic;
   allowing at least a part of the plastic to solidify;
   opening the mold and moving the first movable wall part, such that the product formed can be withdrawn from the mold.

2. A method according to claim 1, wherein displacement of the plastic proceeds while thereby generating adiabatic heat development in the plastic as a result of at least the speed of movement and distance of movement of the second movable wall part.

3. A mold for manufacturing plastic products provided with a bottom and a sidewall, wherein the mold comprises at least a first and second mold part which jointly define at least partly at least one mold cavity and are movable in a first direction, wherein the at least one mold cavity comprises at least one bottom-forming part and one side wall-forming part, wherein on the first mold part at least one fixed wall part is provided which supports a first movable wall part which is movable relative to the respective fixed wall part in at least a second direction which includes an angle with the first direction, wherein in said first movable wall part a second movable wall part is provided, on the side facing the mold cavity, and wherein the second movable wall part is movable within the mold cavity between a forwardly moved position and a retracted position relative to the first movable wall part, and wherein the mold cavity has a first volume when the mold is in a closed position and the second movable wall part is in the refracted position, and wherein the mold cavity has a second volume when the mold is in the closed position and the second movable wall part is in the forwardly moved position, the second volume being less than the first volume, the second movable wall part being movable within the mold cavity when the mold is in the closed position for displacing plastic introduced into the mold cavity to fill the entire mold cavity with plastic.

4. A mold according to claim 3, wherein first operating means for the first movable wall part are provided in the first mold part.

5. A mold according to claim 3, wherein second operating means for the second movable wall part are at least partly provided in the second mold part.

6. A mold according to claim 3, wherein the first mold part comprises at least four fixed wall parts, arranged along four sides of a rectangle, wherein at least two oppositely arranged fixed wall parts comprise a first movable wall part on the side facing the opposed fixed wall part.

7. A mold according to claim 6, wherein each of the four fixed wall parts comprises a first movable wall part.

8. A mold according to claim 6, wherein each of the first movable wall parts comprises a second movable wall part.

9. A mold according to claim 3, wherein the second mold part comprises a core which, with the mold closed, extends between fixed parts of the first mold part, wherein the or each first movable wall part comprises a projection which reaches in the direction of, and preferably against or into, said core, with the mold closed, for forming a cavity and/or opening in a wall part of a product to be formed.

10. A mold according to claim 3, wherein the or each second movable wall part, on a side remote from the respective mold cavity, is provided with a first operating surface, wherein second operating means for the or each second movable wall part comprise a second operating surface for cooperation with the first operating surface, wherein the second operating surface is provided on a slide movable in a third direction which comprises at least one component parallel to the first direction, and wherein the first and/or second operating surface include an angle with said first direction, such that at least with the mold closed, upon movement of said slide in the third direction, the respective second movable wall part is moved from a retracted position to a forwardly moved position or vice versa.

11. A mold according to claim 10, wherein energizing means of the second operating means are provided in the second mold part and the respective slide of the second operating means in the first mold part.

12. A mold according to claim 3, wherein the or each fixed wall part comprises a first guide surface on the side facing the mold cavity, wherein the or each associated first movable wall part comprises a second guide surface which abuts at least partly against the first guide surface, which first and second guide surfaces include an angle with the first direction, wherein the or each second movable wall part is provided on the side of the or each respective first movable wall part that is remote from the guide surfaces.

13. A mold according to claim 3, wherein for the or each second movable wall part a slide is provided as a part of operating means therefor, which slide is movable in a third direction, wherein the or each first movable wall part comprises a guide for said slide.

14. A mold according to claim 3, wherein second operating means are provided for at least the or each second movable wall part, which operating means are arranged such that, with the mold closed, the or each second movable wall part can be pressed so fast from a retracted position to a forwardly moved position, against plastic present in the mold cavity, that adiabatic heat development occurs in said plastic, so that the viscosity of that plastic decreases at least locally.

15. A mold according to claim 3, wherein injection means are provided for plastic, which injection means terminate in or near the bottom-forming part of the or each mold cavity.

16. A mold according to claim 3, wherein in the bottom-forming part at least one third movable wall part is provided which is movable between a retracted position and a forwardly moved position.

17. A mold for manufacturing plastic products provided with a bottom and a sidewall, the mold including a first mold part and a second mold part, the first mold part and the second mold part being movable in a first direction between an open position and a closed position, the first mold part and the second mold part defining a mold cavity when in the closed position, wherein the first mold part comprises:
    a fixed wall part fixed to the first mold part and having an inclined surface with respect to the first direction;
    a first movable wall part supported on the inclined surface of the fixed wall part, the first movable wall part being movable within the mold cavity along the inclined surface relative to the fixed wall part in a second direction, the second direction being disposed at an angle with respect to the first direction; and
    a second movable wall part supported within the first movable wall part and facing the mold cavity, the second movable wall part being movable within the mold cavity in a third direction between a forwardly moved position and a retracted position relative to the first movable wall part when the first mold part and the second mold part are in the closed position, wherein the mold cavity has a first volume when the mold is in the closed position and the second movable wall part is in the retracted position, and wherein the mold cavity has a second volume when the mold is in the closed position and the second movable wall part is in the forwardly moved position, the second volume being less than the first volume, the second movable wall part being movable within the mold cavity for displacing plastic introduced into the mold cavity to fill the entire mold cavity with plastic.

18. A mold as defined in claim 17, wherein the first direction is generally perpendicular to the third direction.

19. A mold as defined in claim 17, wherein the second movable wall part is retained within the first movable wall part and comprises a wall forming part and a wedge, the wedge being movable within the first movable wall part and having an actuating surface in engagement with a complementary actuating surface of the wall forming part for driving the wall forming part in the third direction.

20. A mold as defined in claim 19, further comprising:
    a first operating means provided on the first mold part for moving the first movable wall part; and
    a second operating means provided on the second mold part for moving the wedge of the second movable wall part.

21. A mold as defined in claim 20, wherein the first operating means is disposed opposite the second operating means for moving the wedge of the second movable wall part in the second direction opposite to the first wall part.

* * * * *

UNITED STATES PATENT AND TRADEMARK OFFICE
CERTIFICATE OF CORRECTION

| | | |
|---|---|---|
| PATENT NO. | : 7,785,523 B2 | Page 1 of 1 |
| APPLICATION NO. | : 11/794403 | |
| DATED | : August 31, 2010 | |
| INVENTOR(S) | : Hoogland | |

It is certified that error appears in the above-identified patent and that said Letters Patent is hereby corrected as shown below:

ON THE TITLE PAGE:

Assignee: now reads "ECIM Technologies B.V., Ijssel (NL)"

should read --ECIM Technologies B.V., Capelle A/D Ijssel (NL)--

Column 8, line 49: now reads "in the refracted position"

should read --in the retracted position--

Signed and Sealed this
First Day of March, 2011

David J. Kappos
*Director of the United States Patent and Trademark Office*